US008281123B2

(12) United States Patent
Pering et al.

(10) Patent No.: US 8,281,123 B2
(45) Date of Patent: Oct. 2, 2012

(54) APPARATUS AND METHOD FOR MANAGING AND PROTECTING INFORMATION DURING USE OF SEMI-TRUSTED INTERFACES

(75) Inventors: Trevor A Pering, San Francisco, CA (US); Muralidharan Sundararajan, Portland, OR (US); John J Light, Beaverton, OR (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1005 days.

(21) Appl. No.: 11/388,554

(22) Filed: Mar. 24, 2006

(65) Prior Publication Data

US 2007/0226484 A1 Sep. 27, 2007

(51) Int. Cl.
*H04L 29/00* (2006.01)
(52) U.S. Cl. ........ 713/153; 709/238; 709/239; 709/240; 709/241; 709/242; 709/243; 709/244
(58) Field of Classification Search ........... 713/153–159
See application file for complete search history.

(56) References Cited

U.S. PATENT DOCUMENTS

| | | | | |
|---|---|---|---|---|
| 5,802,320 | A * | 9/1998 | Baehr et al. | 709/249 |
| 6,311,269 | B2 * | 10/2001 | Luckenbaugh et al. | 713/154 |
| 7,082,532 | B1 * | 7/2006 | Vick et al. | 713/155 |
| 7,146,505 | B1 * | 12/2006 | Harada et al. | 713/185 |
| 2003/0065947 | A1 * | 4/2003 | Song et al. | 713/201 |
| 2003/0114190 | A1 | 6/2003 | Want et al. | |
| 2003/0115415 | A1 | 6/2003 | Want et al. | |
| 2004/0093527 | A1 | 5/2004 | Pering et al. | |
| 2004/0203749 | A1 * | 10/2004 | Iyer et al. | 455/432.1 |
| 2004/0205757 | A1 | 10/2004 | Pering | |
| 2005/0010768 | A1 | 1/2005 | Light et al. | |
| 2005/0015604 | A1 | 1/2005 | Sundararajan et al. | |
| 2005/0015723 | A1 | 1/2005 | Light et al. | |
| 2005/0055421 | A1 | 3/2005 | Light et al. | |
| 2005/0060431 | A1 * | 3/2005 | Lewontin | 709/246 |
| 2005/0198035 | A1 | 9/2005 | Sundararajan et al. | |
| 2005/0215195 | A1 | 9/2005 | Light et al. | |
| 2005/0257264 | A1 * | 11/2005 | Stolfo et al. | 726/23 |
| 2005/0268109 | A1 * | 12/2005 | McIntosh | 713/182 |

OTHER PUBLICATIONS

Alvin T.S. Chan, "Cookies on the move: Managing cookies on a smart card", pp. 1693-1697, dated Mar. 2004.
Ross, Steven J. et al, "A Composable Framework for Secure Multi-Modal Access to Internet Services from Post-PC Devices", found in Mobile Networks and Applications vol. 7, Issue 5 (Oct. 2002), pp. 389-406.

* cited by examiner

*Primary Examiner* — Philip Chea
*Assistant Examiner* — Ghazal Shehni
(74) *Attorney, Agent, or Firm* — Kacvinsky Daisak, PLLC

(57) ABSTRACT

A system and method for managing private information while using semi-trusted interfaces is described. In an embodiment, an intermediate node may receive a first and second communication between a semi-trusted node and a trusted node. In managing private information, the intermediate node may append private information to the first communication sent from the semi-trusted node to the trusted node, and remove private information from the second communication sent from the trusted node to the semi-trusted node.

28 Claims, 5 Drawing Sheets

APPARATUS AND METHOD FOR MANAGING AND PROTECTING INFORMATION DURING USE OF SEMI-TRUSTED INTERFACES

FIELD

Embodiments of the invention relate generally to network security. More specifically embodiments relate to providing secure internet transactions using mobile devices.

BACKGROUND

On computer terminals such as public computers, security is often handled by the web browser facilitating internet access. Unfortunately, accessing private and/or personal information on public terminals may compromise the security of such information. For example, in order to use a web-based email site, the user must log into the site by typing their password and then remember to not check the "remember my password" check-box, otherwise the email may be accessible by another user. There is also a great security threat presented by key loggers and other endpoint capture devices; simply typing a password on a public terminal keyboard presents significant security problems. Despite the known risks, many users still use public terminals. Thus, these users often risk having their private information misused.

Fixed and mobile endpoints in an internet network may play various roles in attempts to facilitate secure, functional networks. Web proxies are fixed computer systems located within the client server infrastructure and are typically shared by multiple end users. Web proxies provide caching for fetching of pages but do not serve the purpose of caching secure information. Mobile devices have been used to hold security and identity information so that they may be used as a key or a token for secure payment transactions between a user and other terminals. However, these devices do not manage a user's personal and/or private information at public terminals.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Described herein are selected embodiments of a system, method, and apparatus for managing and protecting private information during use of semi-trusted interfaces. In the following description, for purposes of explanation, numerous specific details are set forth in order to provide a thorough understanding of the present invention. It will be apparent, however to one skilled in the art that the present invention can be practiced without these specific details.

In an embodiment, to manage and/or protect private information a security module of an intermediate node may remove private information from communications between a semi-trusted node and a trusted node and append private information to network traffic between the semi-trusted node and the trusted node.

The security module may encrypt and decrypt communications between trusted and semi-trusted endpoints containing private information. The security module may also append and/or remove private information to/from the communications.

The intermediate node may be a remote server on the internet. In another embodiment the intermediate node may be a mobile device such as a mobile phone.

In an embodiment, intermediate node is a mobile phone that intercepts web communications between a publicly accessed, semi-trusted client computer and a trusted web server computer. The communications are intercepted in order to prevent un-secured private information from becoming accessible on the semi-trusted client. In an embodiment, communication between the mobile phone and both the trusted and semi-trusted nodes is wireless.

Examples of mobile devices may be a laptop computer, a cell phone, a personal digital assistant, or other similar device with on board processing power and wireless communications ability that is powered by a Direct Current (DC) power source that supplies DC voltage to the mobile device and that is solely within the mobile device and needs to be recharged on a periodic basis, such as a fuel cell or a battery.

Figure 1:
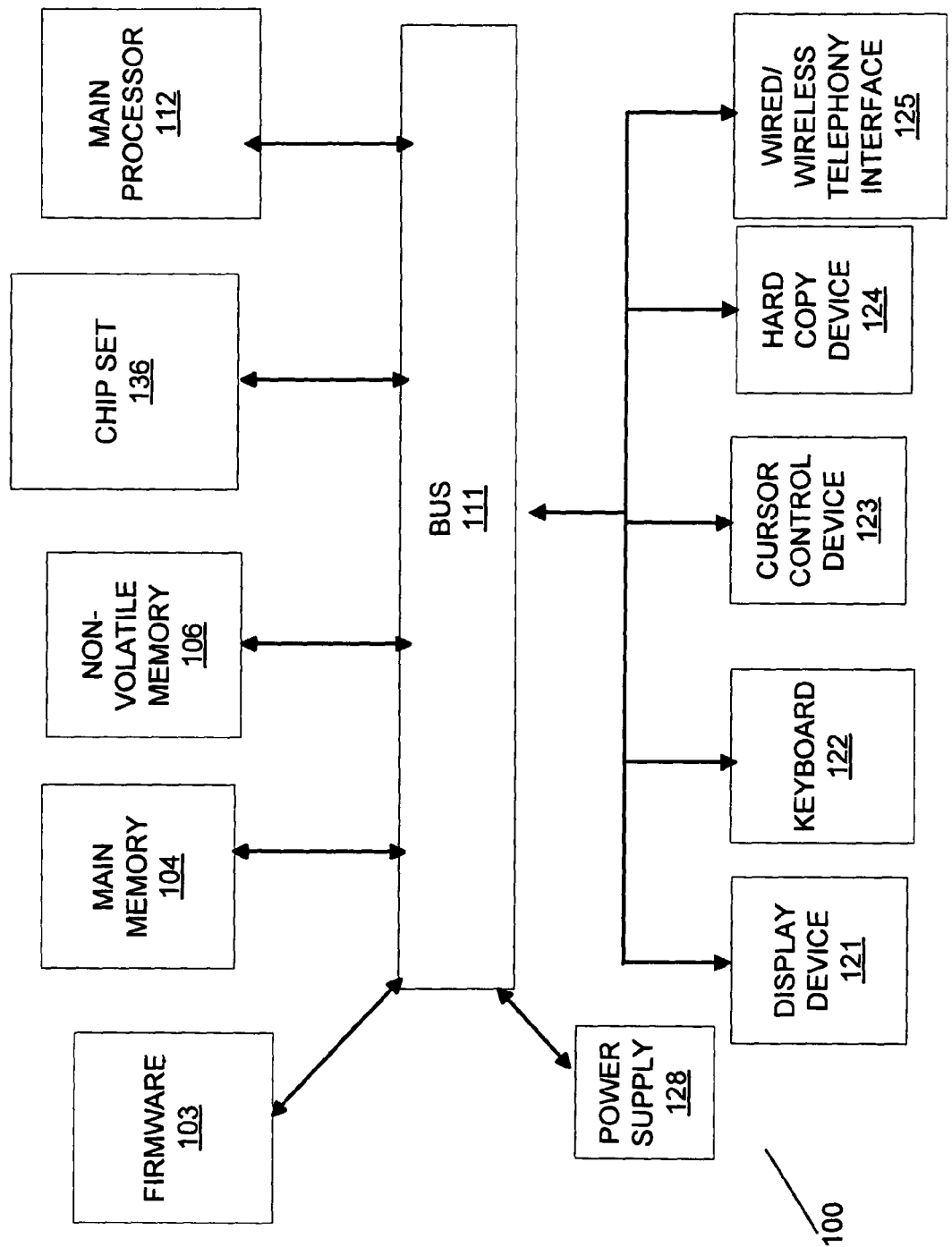
FIG. 1 illustrates a block diagram of an embodiment of a computer system.

FIG. 1 illustrates a block diagram of an example computer system that may use an embodiment of managing and/or protecting private information using an intermediate node. In one embodiment, computer system 400 comprises a communication mechanism or bus 111 for communicating information, and an integrated circuit component such as a main processing unit 112 coupled with bus 111 for processing information. One or more of the components or devices in the computer system 100 such as the main processing unit 112 or a chip set 136 may use an embodiment of managing and/or protecting private information with an intermediate node. The main processing unit 112 may consist of one or more processor cores working together as a unit.

Computer system 100 further comprises a random access memory (RAM) or other dynamic storage device 104 (referred to as main memory) coupled to bus 111 for storing information and instructions to be executed by main processing unit 112. Main memory 104 also may be used for storing temporary variables or other intermediate information during execution of instructions by main processing unit 112.

Firmware 103 may be a combination of software and hardware, such as Electronically Programmable Read-Only Memory (EPROM) that has the operations for the routine recorded on the EPROM. The firmware 103 may embed foundation code, basic input/output system code (BIOS), or other similar code. The firmware 103 may make it possible for the computer system 100 to boot itself.

Computer system 100 also comprises a read-only memory (ROM) and/or other static storage device 106 coupled to bus 111 for storing static information and instructions for main processing unit 112. The static storage device 106 may store OS level and application level software.

Computer system 100 may further be coupled to or have an integral display device 121, such as a cathode ray tube (CRT) or liquid crystal display (LCD), coupled to bus 111 for displaying information to a computer user. A chipset may interface with the display device 121.

An alphanumeric input device (keyboard) 122, including alphanumeric and other keys, may also be coupled to bus 111 for communicating information and command selections to main processing unit 412. An additional user input device is cursor control device 123, such as a mouse, trackball, trackpad, stylus, or cursor direction keys, coupled to bus 111 for communicating direction information and command selections to main processing unit 112, and for controlling cursor movement on a display device 421. A chipset may interface with the input output devices.

Another device that may be coupled to bus 111 is a power supply such as a battery and Alternating Current adapter circuit. Furthermore, a sound recording and playback device, such as a speaker and/or microphone (not shown) may optionally be coupled to bus 111 for audio interfacing with computer system 400. Another device that may be coupled to bus 111 is a wireless communication module 125. The wireless communication module 125 may employ a Wireless Application Protocol to establish a wireless communication channel. The wireless communication module 125 may implement a wireless networking standard such as Institute of Electrical and Electronics Engineers (IEEE) 802.11 standard, IEEE std. 802.11-1999, published by IEEE in 1999.

In one embodiment, the software used to facilitate the intermediate node routines can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g. ROM including firmware; RAM; magnetic disk storage media; optical storage media; flash memory devices; etc.), as well as electrical, optical, acoustical or other form of propagated signals (e.g., carrier waves, infrared signals, digital signals, etc.); etc.

Figure 2:
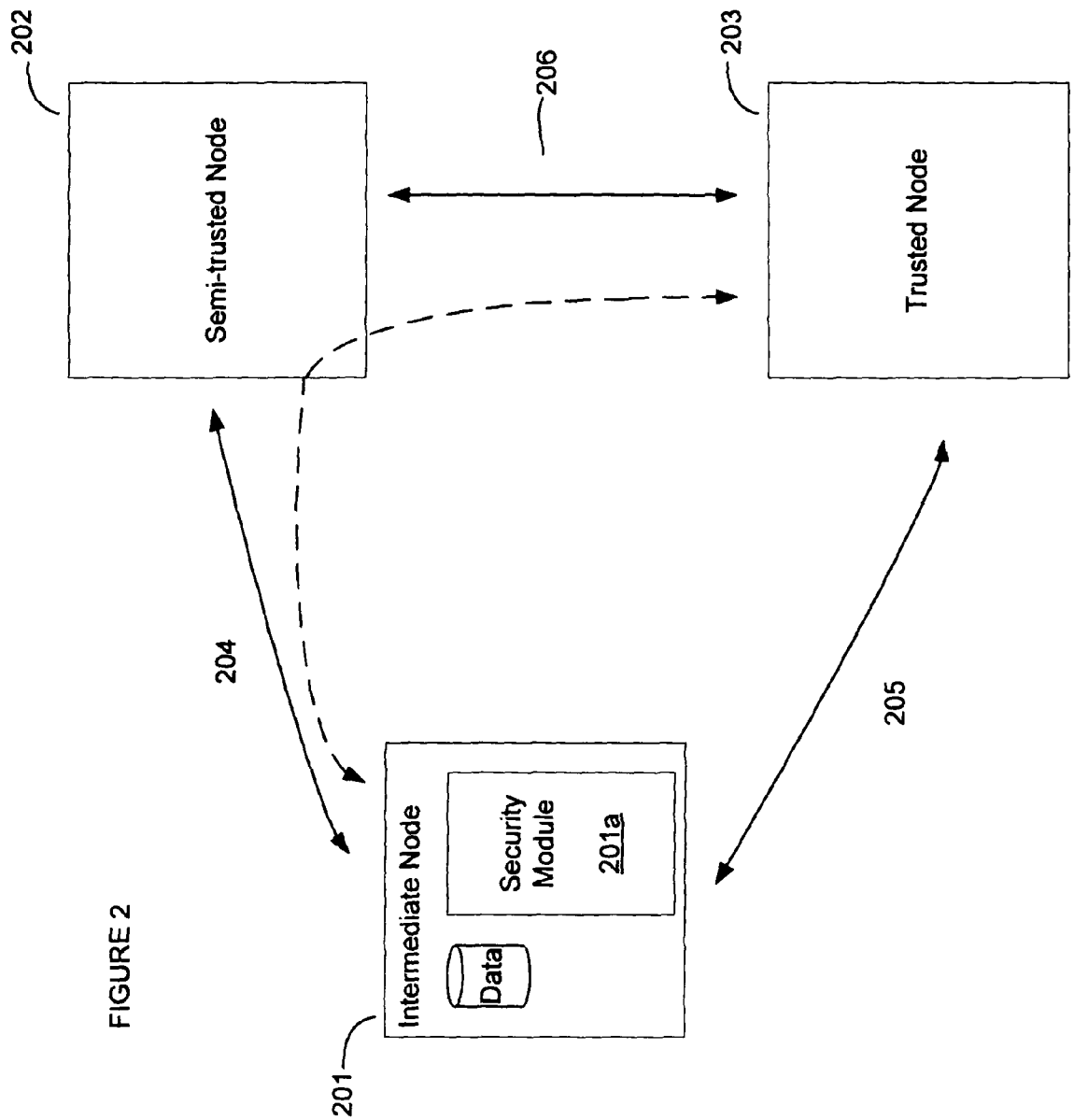
FIG. 2 illustrates a block diagram of an embodiment of a network of computer devices.

FIG. 2 is a block diagram of an embodiment illustrating the use of an intermediate node 201 to manage and/or protect private information. FIG. 2 illustrates communication between a semi-trusted node 202 an intermediate node 201 and a trusted node 203.

As used herein, a node may be a computer system, either in the form of a "real" or a "virtual" machine. A real machine may be a physical machine while, virtual machines may be operating systems that interact with users and hardware of real machines through a trusted virtual machine monitor residing on the virtual machine. One or more virtual machines may reside within a real machine where each virtual machine may have dedicated system resources dedicated to each virtual machine.

In an embodiment, private information may be any information utilized during a session at a semi-trusted node 202 that a user would not want another to obtain. Examples of private information include identity and authentication information such as user login, personal address, e-mail address, phone number, social security number, etc.; financial information related to bank accounts, credit cards, loans, securities, real property etc.; and other information such as websites visited, browsing behavior, searches performed, travel plans, place of employment, etc., and other similar private information.

A semi-trusted node 202 may be a user access point hosting a web browser on a computer where a user's transaction may potentially be accessed by others. (e.g. a computer in a internet café, public library, visitor computer in enterprise, etc.). A trusted node 203 may be a secure computer for which a policy dictates that a user's information will not be accessed by others without the user's permission. (e.g. a secure web server, computers only accessible by trusted operators, etc.).

In an embodiment, link 206 connecting semi-trusted node 202 and trusted node 203 may be any transmission medium known in the art used to put computers or machines in communication (e.g. copper wire twisted pairs, wireless 802.11, fiber optic cable, etc.). An intermediate node 201 may be connected to both the semi-trusted node 202 and the trusted node 203 over links 204 and 205 respectively. The link 204 between intermediate node 201 and semi-trusted node 202 may be any transmission medium known in the art used to put computer devices or machines in communication (e.g. copper twisted pairs, fibre channel, etc.). The link 205 between intermediate node 201 and trusted node 203 may also be any transmission medium known in the art used to put computers or machines in communication.

One or more of the intermediate, semi-trusted and trusted nodes 201, 202, 203 may be run on virtual machines and executed on one or more real machines.

Intermediate node 201 may inter alia, receive communications from semi-trusted node 202 and transmit communications to trusted node 203 and/or receives communications from trusted node 203 and transmits communications to semi-trusted node. In an embodiment, intermediate node 201 may include a security module 201a which may be used to prevent private information from being surrendered to uninvited inquiries when a user interacts with semi-trusted node 202.

Thus, intermediate node 201 may receive communications communicated between semi-trusted node 202 and trusted node 203. Security module 201a may remove private information from the communications sent from trusted node 203 to semi-trusted node 202. Security module 201a may also append private information to the communications sent from semi-trusted node 202 to trusted node 203. In an embodiment, the private information that is removed from communications between semi-trusted node 202 and trusted node 203 is stored within the intermediate node 201.

Intermediate node 201 may be configured to manage and/or protect the private information across a plurality of semi-trusted nodes. For example, the intermediate node 201 may allow a website to access previously established private information (e.g. cookies, form data, etc.) via security module 201a even though the user connects to the website from different public access points. If a user were to access the same website from multiple semi-trusted nodes without intermediate node 201, the website would need to re-obtain private information from the user at each semi-trusted node.

In an embodiment, intermediate node 201 may receive a communication (e.g. data transfer) bound for trusted node 203 from semi-trusted node 202. After appending private information to the communication, security module 201a may encrypt the appended communication before forwarding it to trusted node 203.

In one embodiment, the encrypted message is transferred to trusted node 203 via link 204 (e.g. Bluetooth), semi-trusted node 202, and link 206 (e.g. Ethernet). The encrypted message is secure and its contents are not accessible on semi-trusted node. In another embodiment, the encrypted message is transferred to trusted node 203 via link 205 (e.g. via General Packet Radio Service (GPRS), Global System for Mobile Communications (GSM), Worldwide Interoperability for Microwave Access (WiMax), WiFi, etc.).

Intermediate node may receive a communication bound for semi-trusted node 202 from trusted node 203. After decrypting the communication, security module 201a may remove the private information and store it within intermediate node 201, before forwarding the remaining communication to semi-trusted node 202.

For users of semi-trusted terminals, private information may be managed and/or protected. Also, the efficiency benefits of storing private information on a computer (e.g. cookies, form information, passwords) for use by a remote web server may be realized across multiple semi-trusted computers using embodiments described herein.

Figure 3:
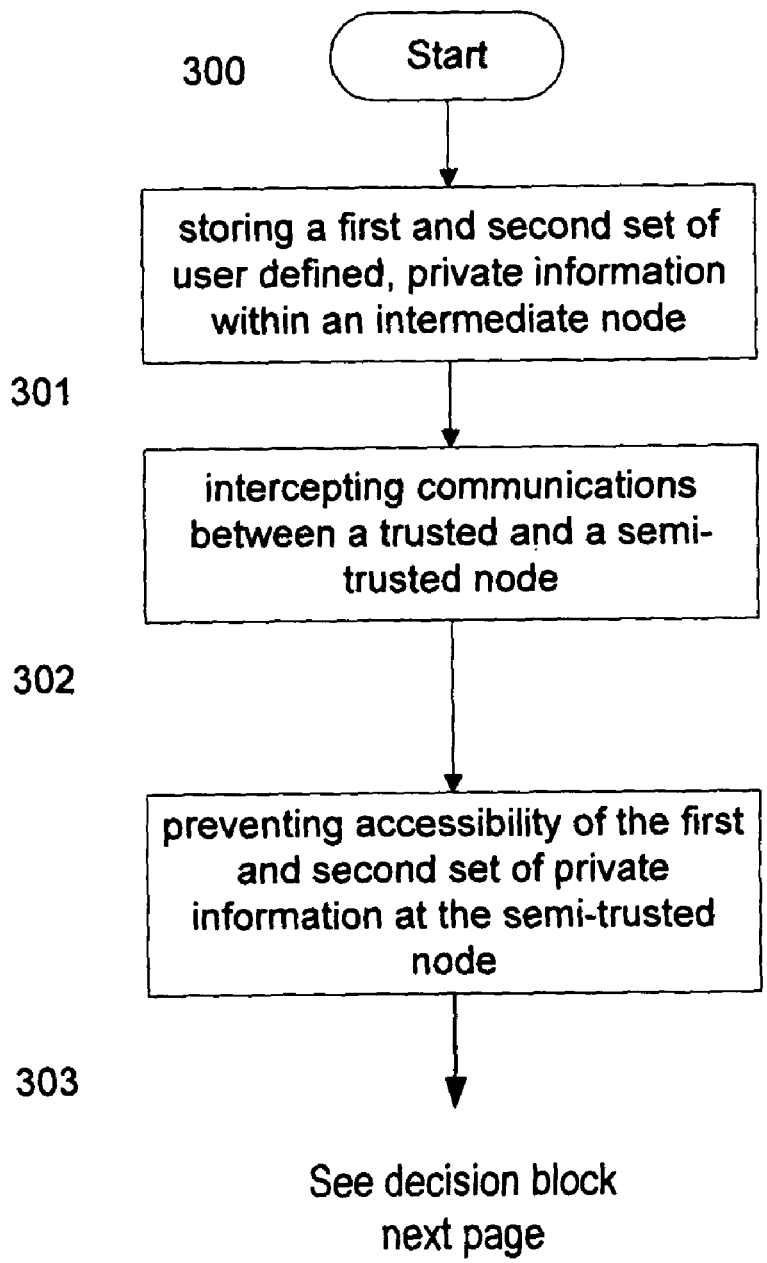
FIG. 3 is a flow diagram of an embodiment of a process for managing private information during use of a semi-trusted node.
Figure 4:
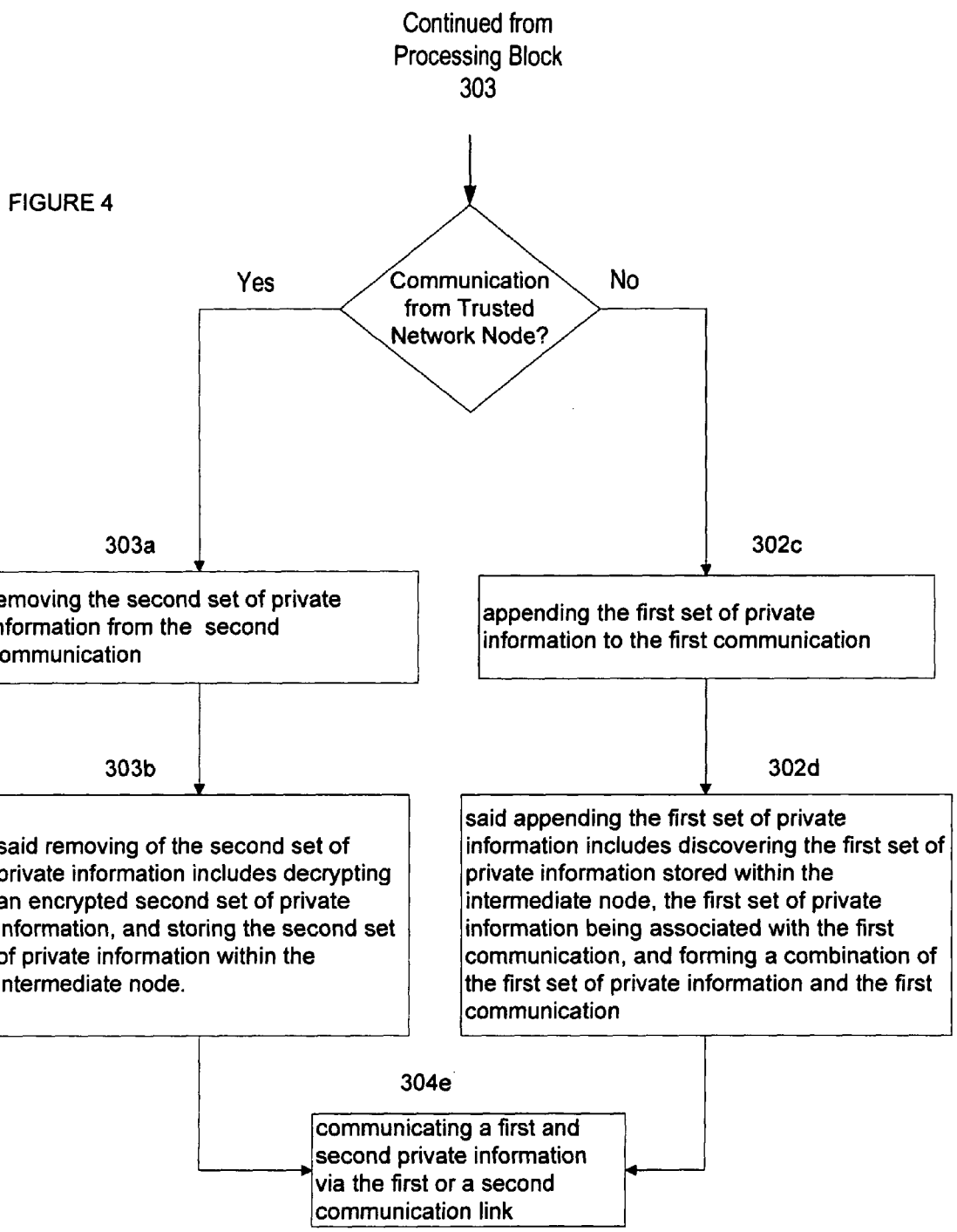
FIG. 4 is a continuation of the flow diagram of an embodiment of a process for managing private information during use of a semi-trusted node.

FIG. 3 is a flow diagram of an embodiment of a process 300 for managing private information with a security module 201a of an intermediate node 201 during use of a semi-trusted node. The security module 201a may perform the process by processing logic that may comprise hardware (e.g., circuitry, dedicated logic, programmable logic, microcode, etc.), software (such as that run on a general purpose computer system or a dedicated machine), or a combination of both.

In one embodiment, process 300 is performed by security module 201a of intermediate node 201 of FIG. 2. In FIG. 3, process 300 starts with processing logic storing a first and second set of user defined, private information within an intermediate node (processing block 301). Processing logic may then proceed by intercepting communications between a trusted and a semi-trusted node (processing block 302).

Processing logic may conclude by preventing access to the first and second set of private information at the semi-trusted node (processing block 303).

Processing block 303 contains three sub-processes, one to be selected from the following: 1) If a communication is received from a trusted node then processing logic proceeds by removing the second set of private information from the second communication (processing block 303a), where removing the second set of private information includes decrypting an encrypted second set of private information, and storing the second set of private information within the intermediate node (processing block 303b). 2) If a communication is not received from a trusted node then processing logic proceeds by appending the first set of private information to the first communication (processing logic 303c), where appending the first set of private information includes discovering the first set of private information stored within the intermediate node, the first set of private information being associated with the first communication, and forming a combination of the first set of private information and the first communication. 3) In either case processing logic follows by communicating the first and second private information via a first or a second communication link (processing block 303e). Thus embodiments of a process for managing private information have been disclosed.

Figure 5:
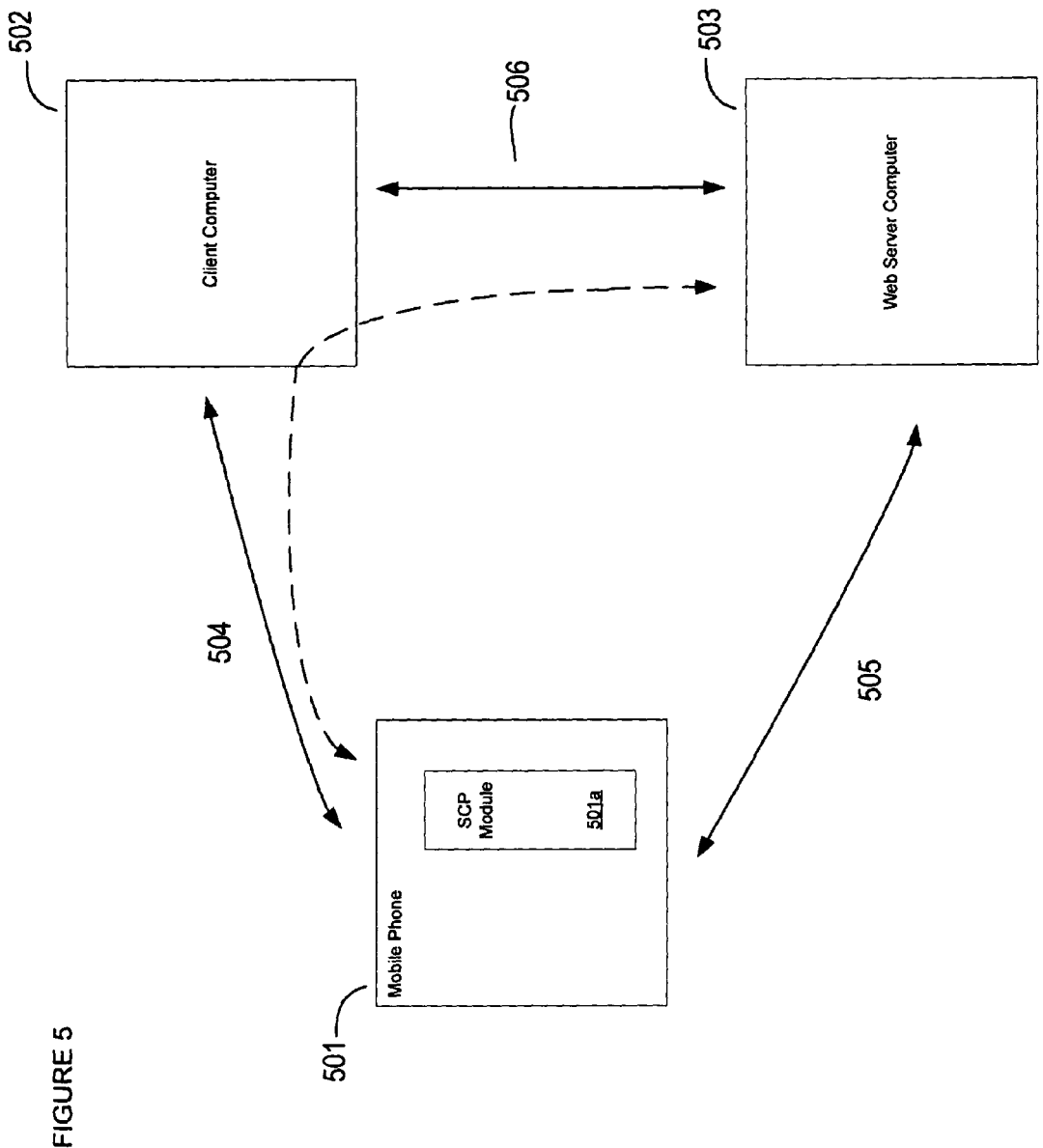
FIG. 5 illustrates a block diagram of an embodiment of a network of computer devices.

FIG. 5 is a block diagram of a mobile device 501 networked between a client computer 502 and a web server computer 503. In an embodiment, a Security Caching Proxy (SCP) module 501a performs a personal web proxy function that maintains the security and identity state associated with standard web transactions. In an embodiment, SCP module 501a may be hosted on the Internet (e.g., an externally accessible "home server") instead of being hosted by mobile device 501.

In one embodiment SCP module 501a is implemented within mobile phone 501. The mobile phone 501 may be networked between a semi-trusted client computer 502 and trusted web server computer 503. In an embodiment, the link 504 between the mobile phone 501 and the semi-trusted client computer is a Bluetooth wireless link. The link 205 between the mobile phone 501 and the web server computer 503 is GPRS.

In an embodiment, the client computer 502 is semi-trusted and the web server computer 503 is trusted. Thus, transactions between the web server computer 503 and SCP module 501a of mobile phone 501 are secure while transactions between the SCP module 501a of mobile device 501 and the client 502 are not secure.

In an embodiment, SCP module 501a manages all the necessary cookies or password auto-complete fields associated with web transactions, and also mange https Secure Sockets Layer (SSL) connections with a web host. A user may operate the web browser of client computer 502 (e.g. an internet access point at an internet café) to access personal content. While using the semi-trusted client computer 502, SCP module 501a of mobile phone 501 acts as a secure proxy for their transactions.

To initiate an SCP module 501a session, client computer 502 is configured to use the SCP module 501a of mobile phone 501. The user may authenticate with SCP module 501a through any of a variety of techniques known to a person having reasonable skill in the art. Transactions initiated at the web browser of client computer 502 are handled through SCP module 501a until the session is terminated.

SCP module 501a may intercept and strip cookies or other sensitive information delivered from the web server computer 503. The stripped information may be and stored within mobile phone 501 so as to not be passed along to the semi-trusted client computer 502. Conversely, SCP module 501a of mobile device 501 may store appropriate cookies and passwords along with the web requests to web server computer 503, making it look like they originated from the web browser of client computer 502 itself.

For users of semi-trusted client computers, private information may be managed and/or protected. Through use of the SCP module, private information is not left unsecured at the semi-trusted client.

In general, using embodiments disclosed herein, uninvited accesses to a user's private information may be prevented. The efficiency benefits of storing private information on a computer (e.g. cookies, form information, passwords) may be realized across multiple semi-trusted computers by using a mobile secure proxy. The use of a small intermediate node (e.g. a mobile phone) enables a convenient means for a user to manage and/or protect private information over one or more semi-trusted computers. Current mobile devices (e.g. cell phones, notebook computers) may provide the processing for implementing an SCP module (e.g. advanced cryptography, wireless communication), and thus, the secure use of a semi-trusted terminal. Users may avoid the security threat presented by key loggers and other endpoint capture devices by using the security module of an intermediate node disclosed herein to provide login information that would normally need to be typed on the keyboard of the semi-trusted terminal.

Through use of embodiments disclosed herein and the security of private information, users may be more willing to use public internet access computers which may enhance the overall utility of public access computers.

Thus, a method and apparatus for managing private information using semi-trusted interfaces has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus, comprising:
an intermediate node operative to receive a first communication from a semi-trusted node, append private information to the first communication, and send the first communication and the private information to a trusted node, or to receive a second communication from the trusted node, remove private information from the second communication, and send the second communication with the private information removed to the semi-trusted node, wherein the appending and the removing of private information are performed by a security module of the intermediate node and the private information is inaccessible to the semi-trusted node, the intermediate node is arranged to store the private information and the security module is arranged to manage the private information across a plurality of semi-trusted nodes, wherein the intermediate node comprises a mobile device having wireless communication capabilities and wherein communications between the intermediate node and the semi-trusted node utilize a first wireless communication protocol and communications between the intermediate node and the trusted node utilize a second wireless communication protocol that is different than the first wireless communication protocol.

2. The apparatus of claim 1, wherein one or more of the intermediate node, semi-trusted node and the trusted node are run on a separate virtual machine and are executed on a single real machine.

3. The apparatus of claim 1, wherein the intermediate node includes a memory to store the private information within the intermediate node.

4. The apparatus of claim 1, wherein the security module further to encrypt the first communication following said appending of private information, and to forward an appended first communication to the trusted node.

5. The apparatus of claim 4, wherein said forwarding is at least in part over a wireless communication link.

6. The apparatus of claim 5, wherein the security module further to decrypt the second communication prior to said removing of private information, and to forward a remaining portion of the second communication to the semi-trusted node.

7. The apparatus of claim 6, wherein said forwarding is at least in part over a wireless communication link.

8. The apparatus of claim 7, wherein an intermediate node includes a mobile device capable of communicating wirelessly, the semi-trusted node includes a client computer having a web browser, wherein a user's unsecured private information is accessible without permission from the user, and the trusted node includes a web server computer, wherein the user's unsecured private information is not accessible without permission from the user.

9. The apparatus of claim 8, wherein the mobile device is a wireless phone, a first wireless link for communication between the wireless phone and the web browser of the client computer is implemented through one of Bluetooth and WiFi wireless protocols, and a second wireless link for communication between the wireless phone and the web server computer is implemented through the same communication protocol as the wireless phone.

10. A method, comprising:
storing a first and second set of user defined, private information within an intermediate node;
intercepting communications between a trusted and a semi-trusted node, wherein communications between the intermediate node and the semi-trusted node utilize a first wireless communication protocol and communications between the intermediate node and the trusted node utilize a second wireless communication protocol that is different than the first wireless communication protocol;
preventing access to the first and second set of private information at the semi-trusted node; and
managing the first and second set of private information across a plurality of semi-trusted nodes.

11. The method of claim 10, further comprising: appending the first set of private information to a first communication; securing the first set of private information; removing the second set of private information from a second communication; and communicating the first and second private information via a first or a second communication link.

12. The method of claim 11, wherein said appending the first set of private information includes discovering the first set of private information stored within the intermediate node, the first set of private information being associated with the first communication, and forming a combination of the first set of private information and the first communication.

13. The method of claim 11, wherein securing the first set of private information includes encrypting the combination of the first set of private information and the first communication.

14. The method of claim 11, wherein said removing of the second set of private information includes decrypting an encrypted second set of private information, and storing the second set of private information within the intermediate node.

15. The method of claim 11, further comprising: communicating the first and second private information via the first or a second communication link.

16. A machine-readable medium not including a transmission containing instructions which, when executed by a processing system, cause the processing system to perform operations, the operations comprising:
storing a first and second set of user defined, private information within an intermediate node;
intercepting a first data transfer between a trusted and a semi-trusted node, communications between the intermediate node and the semi-trusted node utilize a first wireless communication protocol and communications between the intermediate node and the trusted node utilize a second wireless communication protocol that is different than the first wireless communication protocol; and
preventing transmission of the private information to the semi-trusted node; and
managing the first and second set of private information across a plurality of semi-trusted nodes.

17. The machine-readable medium of claim 16, further comprising: appending the first set of private information to the first data transfer directed at the trusted node; transmitting a secured first set of private information to the trusted node; and removing the second set of private information from a second data transfer directed at the semi-trusted node.

18. The machine-readable medium of claim 17, wherein said appending the first set of private information includes discovering the first set of private information stored within the intermediate node, the first set of private information being associated with the data transfer request, and forming a combination of the first set of private information and the data transfer request.

19. The machine-readable medium of claim 17, wherein said transmitting of the secure first set of private information includes encrypting the combination of the first set of private information and the data transfer request.

20. The machine-readable medium of claim 17, wherein said removing of the second set of private information includes receiving an encrypted response including the second set of private information from the trusted node, via the second communication link, decrypting the encrypted response, and storing the second set of private information within the intermediate node.

21. The machine-readable medium of claim 17, wherein preventing transmission of the private information includes delivering the response to the semi-trusted node via the first communication link, without the first set or the second set of private information.

22. A system, comprising:
an intermediate node to receive a first and second communication between a semi-trusted node and a trusted node, wherein communications between the intermediate node and the semi-trusted node utilize a first wireless communication protocol and communications between the intermediate node and the trusted node utilize a second wireless communication protocol that is different than the first wireless communication protocol, the intermediate node having a security module to append private information to the first communication sent from the semi-trusted node to the trusted node, and to remove private information from the second communication sent from the trusted node to the semi-trusted node, the intermediate node arranged to store the private information and the security module arranged to manage the private information across a plurality of semi-trusted nodes, wherein the appending and the removing of private information are performed by the security module and the private information is inaccessible to the semi-trusted node; and a mobile radio antenna within the intermediate node to communicate with at least one of the semi-trusted node and the trusted node.

23. The system of claim 22, wherein the intermediate node includes memory to store the private information within the intermediate node.

24. The system of claim 22, wherein the security module further to encrypt the first communication following said appending of private information, and to forward an appended first communication to the trusted node.

25. The system of claim 24, wherein said forwarding is at least in part over a wireless communication link.

26. The system of claim 25, wherein the security module further to decrypt the second communication prior to said removing of private information, and to forward a remaining portion of the second communication to the semi-trusted node.

27. The system of claim 26, wherein an intermediate node includes a mobile device capable of communicating wirelessly; the semi-trusted node includes a client computer having a web browser, wherein a user's unsecured private information is accessible without permission from the user; and the trusted node includes a web server computer, wherein the user's unsecured private information is not accessible without permission from the user.

28. The system of claim 27, wherein the mobile device is a wireless phone, a first wireless link for communication between the wireless phone and the web browser of the client computer is implemented through one of Bluetooth and WiFi wireless protocols, and a second wireless link for communication between the wireless phone and the web server computer is implemented through the same protocol as the wireless phone.

* * * * *

UNITED STATES PATENT AND TRADEMARK OFFICE
CERTIFICATE OF CORRECTION

| | | |
|---|---|---|
| PATENT NO. | : 8,281,123 B2 | Page 1 of 1 |
| APPLICATION NO. | : 11/388554 | |
| DATED | : October 2, 2012 | |
| INVENTOR(S) | : Trevor A Pering et al. | |

It is certified that error appears in the above-identified patent and that said Letters Patent is hereby corrected as shown below:

In column 8, line 40, in claim 16, delete "node," and insert -- node, wherein --, therefor.

Signed and Sealed this
Eighteenth Day of December, 2012

David J. Kappos
*Director of the United States Patent and Trademark Office*